United States Patent
Wilson et al.

(10) Patent No.: US 9,754,610 B2
(45) Date of Patent: Sep. 5, 2017

(54) MAGNETIC RECORDING SYSTEM WITH TERNARY PATTERN DEPENDENT WRITE SIGNALING

(71) Applicant: Avago Technologies General IP (Singapore) Pte. Ltd., Singapore (SG)

(72) Inventors: Bruce A. Wilson, San Jose, CA (US); Ross S. Wilson, Menlo Park, CA (US); Peter J. Windler, Fort Collins, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/977,595

(22) Filed: Dec. 21, 2015

(65) Prior Publication Data

US 2017/0178670 A1    Jun. 22, 2017

(51) Int. Cl.
  *G11B 5/09* (2006.01)
  *G11B 5/00* (2006.01)
  *G11B 20/10* (2006.01)
  *G11B 5/012* (2006.01)
  *G11B 5/02* (2006.01)

(52) U.S. Cl.
  CPC ............ *G11B 5/09* (2013.01); *G11B 5/012* (2013.01); *G11B 5/02* (2013.01); *G11B 20/10009* (2013.01); *G11B 2005/0013* (2013.01); *G11B 2005/0016* (2013.01)

(58) Field of Classification Search
  None
  See application file for complete search history.

(56) References Cited

U.S. PATENT DOCUMENTS

| | | | |
|---|---|---|---|
| 6,337,778 B1 * | 1/2002 | Gagne | H03L 7/18 360/46 |
| 8,315,128 B1 | 11/2012 | Wilson et al. | |
| 8,390,314 B2 | 3/2013 | Dang et al. | |
| 8,625,231 B1 * | 1/2014 | Dhanda | 360/75 |
| 8,792,197 B1 * | 7/2014 | Wilson | G11B 5/02 360/46 |
| 8,854,936 B1 | 10/2014 | Maul et al. | |
| 8,929,013 B1 * | 1/2015 | Mastrocola | G11B 20/10222 360/46 |
| 9,030,770 B2 | 5/2015 | Contreras et al. | |
| 2007/0146922 A1 * | 6/2007 | Okada | G11B 5/09 360/67 |
| 2012/0243390 A1 | 9/2012 | Lennard et al. | |
| 2013/0128375 A1 * | 5/2013 | Livshitz | G11B 5/02 360/48 |
| 2014/0064404 A1 | 3/2014 | Gonzalez | |

(Continued)

*Primary Examiner* — Tan X Dinh (74) *Attorney, Agent, or Firm* — Sheridan Ross P.C.

(57) ABSTRACT

A storage system includes a magnetic write head, a magnetic storage medium, a write data circuit having a write data output and a magnet length signal output, and a preamplifier that receives the write data and a magnet length signal from the write data circuit, and sets at least one write current characteristic through the magnetic write head based at least in part on the magnet length signal. The write data circuit processes write data to be recorded on the magnetic storage medium by the magnetic write head. The magnet length signal output communicates magnet lengths in the write data.

20 Claims, 4 Drawing Sheets

(56) References Cited

U.S. PATENT DOCUMENTS

2015/0213813 A1* 7/2015 Lammers ......... G11B 20/10018
360/46
2015/0318014 A1* 11/2015 Wilson ............. G11B 20/10027
360/46

* cited by examiner

MAGNETIC RECORDING SYSTEM WITH TERNARY PATTERN DEPENDENT WRITE SIGNALING

FIELD OF THE INVENTION

Various embodiments of the present invention provide systems and methods for pattern dependent write signaling in a magnetic recording system.

BACKGROUND

Various magnetic recording systems such as hard disk drives utilize a write head to record data on a magnetic medium. Data to be recorded is provided to the write head coil as an alternating electrical current. The electrical current passes through a metallic coil wrapping around the write head, generating a magnetic field. The magnetization state of a pole tip in the write head is switched by the magnetic field. As the magnetized pole tip is passed over the magnetic storage medium, for example a spinning ferromagnetic platter, the magnetization of regions of the magnetic medium below the pole tip are altered and can later be read back to retrieve the data. With the write head mounted on a movable arm over the magnetic medium, signals are passed in some parts of the system on a flexible circuit with limited space.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Various embodiments of the present invention provide systems and methods for pattern dependent write signaling using ternary signals between a write data circuit in a read channel and a preamplifier in a magnetic recording system. In such a system, one or more characteristics of the write current through the pole tip are controlled based in part on the data pattern being written, and specifically, based on the magnet lengths or the number of successive same-valued bits. Pattern dependent write (PDW) provides control of one or more aspects of the write current used to record bits on a magnetic storage medium, for example controlling current overshoot amplitude and/or duration, thereby improving recording quality, hence areal density and bit-error-rate. The write current used to record a bit is controlled at each transition of the write data as a function of the data pattern around that transition.

During recording of closely-spaced magnetic transitions of minimum run-length (1 T, where T is the fundamental bit interval), the magnetic state of the head's pole-tip will have insufficient time to become magnetically saturated. An aggressive write current overshoot setting can then be used to drive the pole tip quickly from one saturated state to the opposite saturated state. A less aggressive setting is used for longer prior run-lengths. The short run length case favors use of an aggressive overshoot setting or other write current characteristics for faster magnetic switching. Thus, it is beneficial to provide means of dynamically varying writer parameters as a function of run-length of present and adjacent bit cells. The same arguments and benefits also pertain to some extent to 2 T-length magnets, or to particularly troublesome other transition lengths.

Write head switching is a particularly complicated process that affects overall recording performance in magnetic recording systems. Switching of a pole tip in the write head is initiated by the magnetic field from a coil wrapped around the pole tip. Rapid switching of the pole tip magnetization is a bottleneck for a fast write process. The write current passing through the coil and the magnetization state of the pole tip (and, hence, the magnetic field affecting switching of the bits on the disk platter) are related non-linearly due to the characteristics of the magnetic medium and the intrinsic time scale of the magnetization process. Magnetic response is significantly delayed in time from the write current and has a saturation wave shape which is different from the write current. Thus, the particular characteristics of the write current are adapted to the characteristics and requirements of the magnetic recording system, including the magnetic characteristics of the pole tip and the magnetic data storage medium or disk platter, the rate at which the data is written, the areal density for data storage on the magnetic medium, etc. Such characteristics can be controlled in the magnetic recording system disclosed herein to improve recording quality.

Rather than explicitly signaling the boost level or other write current characteristics to the preamplifier, the write data circuit signals the length of each magnet in write data to be recorded. Signaling from the write data circuit to the preamplifier is made more difficult by the very high data rates involved and by the fact that the write data timing is deliberately perturbed in order to precompensate for distortions in the write process.

The preamplifier selects the boost level or other write current characteristics based on the length of the magnets preceding and following each transition in the write data.

One or more ternary or three-level pulse-amplitude modulated (PAM-3) signals, or other multi-level signals, are used to communicate magnet lengths from a write data circuit to a preamplifier along with write data to be recorded on a magnetic storage medium. Such signaling techniques reduce the number of traces used on a flexible circuit between the write data circuit and the preamplifier, and in some embodiments, also relax timing requirements.

In some embodiments, the pulse-amplitude modulated signaling scheme is used to communicate the length of recorded magnets in the future data stream. The knowledge of these magnet lengths allows the preamplifier to compute an appropriate pattern-dependent value for write current parameters. The knowledge of the lengths of upcoming magnets in the data stream also enables the preamplifier to generate a sample clock from the write data which allows sufficient set-up and hold time at data latches in the preamplifier such that data can be reliably detected when read back from the storage medium.

Figure 1:
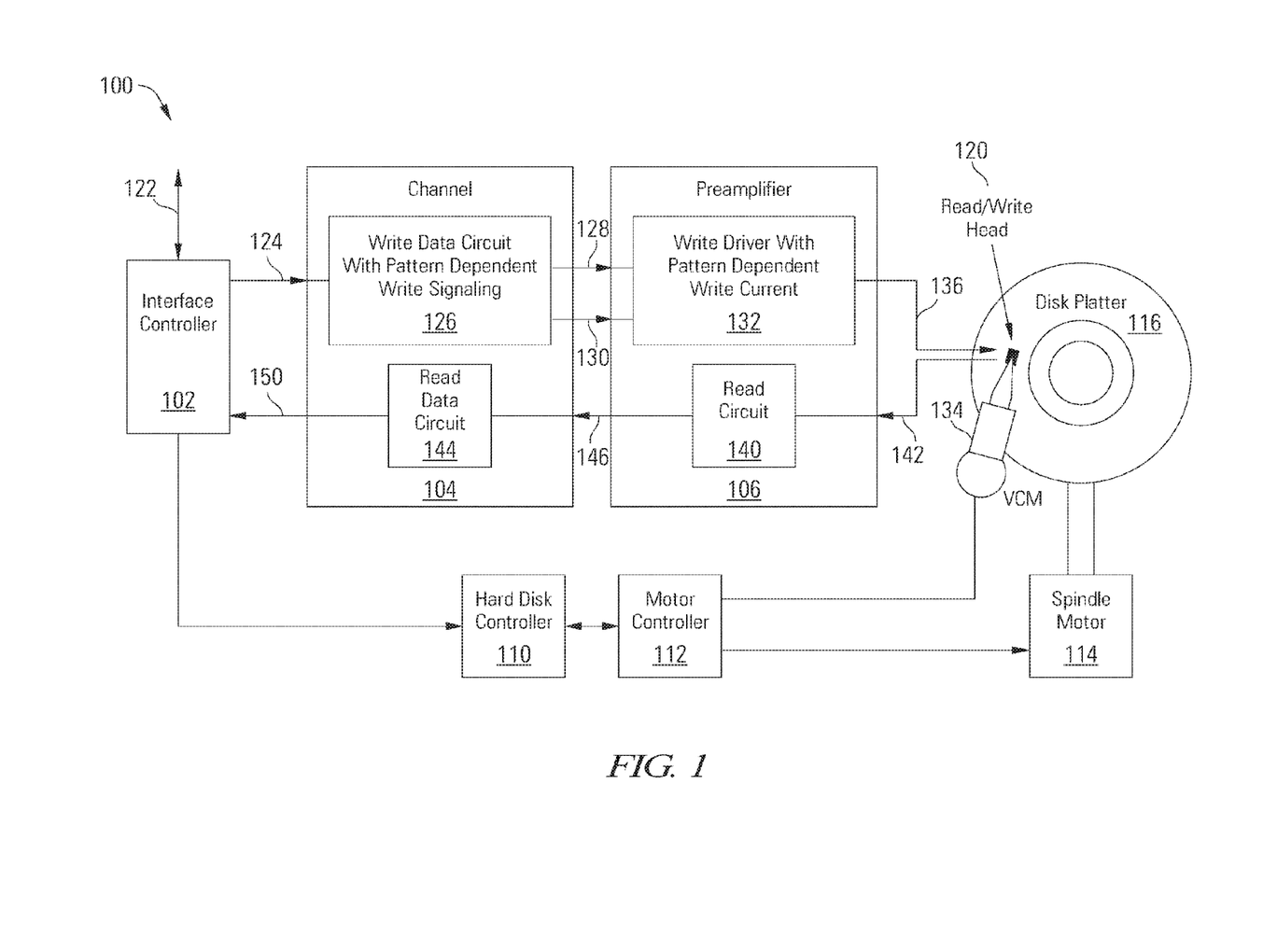
FIG. 1 depicts a magnetic storage system including a write data circuit and preamplifier with ternary pattern dependent write signaling in accordance with some embodiments of the present invention.

Turning to FIG. 1, a magnetic storage system 100 or hard disk drive with pattern dependent write signaling is depicted in accordance with some embodiments of the invention. Storage system 100 includes an interface controller 102, channel 104, preamplifier 106, a hard disk controller 110, a motor controller 112, a spindle motor 114, a disk platter 116, and a read/write head assembly 120. Interface controller 102 controls addressing and timing of data to/from disk platter 116. The interface controller 102 may include devices such as a processor, buffer memory, format control, error correction circuits, and interface circuits. The data on disk platter 116 consists of magnetic signals that may be written and detected by read/write head assembly 120 when the assembly is properly positioned over disk platter 116. In one embodiment, disk platter 116 includes magnetic signals recorded in accordance with either a longitudinal or a perpendicular recording scheme.

In a typical write operation, interface controller 102 receives digital data 122 to be stored on the disk platter 116 and provides corresponding digital write data 124 to a write data circuit 126 in the channel 104. The digital data 122 may be received in serial form on a standardized device interface such as a Serial Advanced Technology Attachment (SATA) interface. During write operations, the digital data 122 is stored in a local buffer memory, formatted and augmented with error correction codes.

Write data circuit 126 may process the digital write data 124 in a number of ways, such as serializing the data at the desired bit rate, modulation coding the data and adding parity bits, and performing write pre-compensation. The write data circuit 126 provides write data 128 to a write driver 132 in preamplifier 106. The write data circuit 126 also detects patterns in the write data and generates a pattern dependent write (PDW) signal 130, also referred to herein as a magnet length signal, that is provided to a write driver 132 in the preamplifier 106 to identify magnet lengths in the write data 128, enabling the write driver 132 to control write current characteristics based on the magnet lengths.

In some embodiments, the preamplifier 106 is mounted on an actuator arm 134, and the write data 128 and the PDW signal 130 are driven from the channel 104 by a transmitter and delivered over a flexcircuit in differential format or any other suitable format to the write driver 132 in the arm-mounted preamplifier 106. The preamplifier 106 converts the write data 130 to an analog signal, performs waveshaping, adds overshoot pulses or controls other write current parameters to aid the recording process based on the magnet lengths identified by the PDW signal 130, and impresses in the write head portion of read/write head assembly 120 a bipolar programmable write current 136.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). A read circuit 140 in the preamplifier 106 establishes a bias current in the magneto-resistive sensor(s) on read/write head assembly 120. Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal(s) 142 representative of the magnetic data on disk platter 116. The minute analog signal(s) 142 are transferred from read/write head assembly 120 to read circuit 140 in the preamplifier 106, where they are amplified and are conveyed to a read data circuit 144 in the channel 104 as analog read data 146. In turn, the read data circuit 144 in channel 104 decodes and digitizes the received analog signal to recreate the user data originally written to disk platter 116, as well as extracting servo information.

As part of processing the analog read data 146, the read data circuit 144 may perform one or more operations such as analog filtering, variable gain amplification, analog to digital conversion, equalization, timing recovery, data detection, decoding, deserialization, and servo demodulation to obtain the user data and servo information. The user data is provided by the read data circuit 144 as digital read data 150 to the interface controller 102, where it can be further error-corrected, stripped of special formatting fields, and reassembled in a buffer memory for transmission to a user device as digital data 122.

Figure 2:
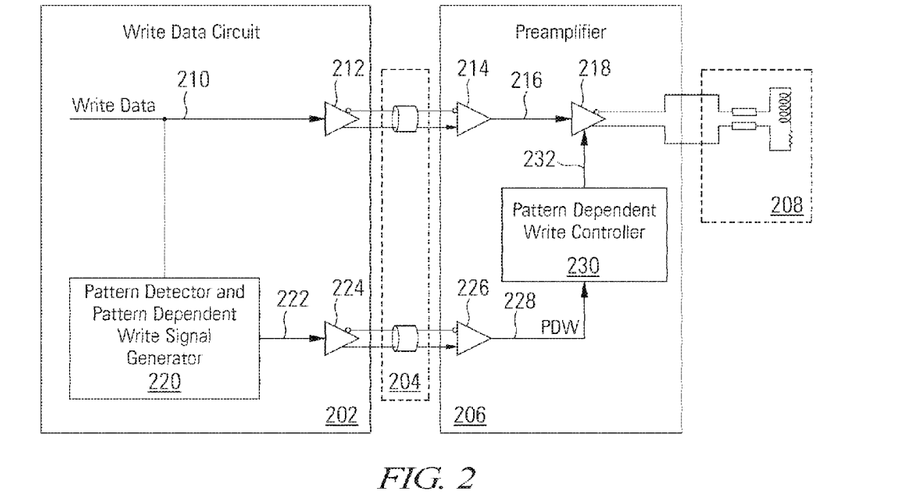
FIG. 2 depicts a write data circuit and preamplifier with single ternary pattern dependent write signaling in accordance with some embodiments of the present invention.

Turning to FIG. 2, a write data circuit 202 and preamplifier 206 with single ternary pattern dependent write signaling is depicted in accordance with some embodiments of the present invention. The write data circuit 202 processes write data 210 for storage, for example by serializing the data, applying pre-compensation, or in any other desired manner. The write data circuit 202 includes a pattern detector and pattern dependent write signal generator 220 which identifies magnet lengths, the number of successive bit values in the write data 210, and which generates a pattern dependent write (PDW) signal 222 identifying the magnet lengths in the write data 210. In some embodiments, the pattern dependent write signal 222 identifies the length of future magnets to allow time for processing in the preamplifier 206. The pattern detector and pattern dependent write signal generator 220 can use any suitable circuit for identifying magnet lengths, such as, but not limited to, chains of flip flops with logic gates combining the outputs of the flip flops, state machines, etc. In some embodiments, the pattern dependent write signal 222 is a ternary or other multi-level signal, and the pattern detector and pattern dependent write signal generator 220 can use any suitable circuit for generating a ternary signal identifying patterns detected in the write data 210. Based on the disclosure herein, one of ordinary skill in the art will recognize a variety of circuits and techniques that can be used to detect magnet lengths or patterns in the write data 210 and to generate one or more ternary signals to identify the magnet lengths in accordance with various embodiments of the present invention.

In some embodiments, the write data 210 and pattern dependent write signal 222 are transmitted as differential signals over a flexible circuit 204 for noise immunity. Differential transmitters 212, 224 are thus included in the write data circuit 202. Rising and falling transitions in the differential write data and pattern dependent write signals are defined, respectively, as negative-to-positive and positive-to-negative excursions of the differential signals. Differential receivers 214, 226 are included in the preamplifier 206 in these embodiments, yielding write data 216 and pattern dependent write signal 228 in the preamplifier 206. The preamplifier 206 is operable to process the write data 216 for recording on a magnetic storage medium using a write head 208 during write operations, as well as to amplify analog readback signals from the write head 208 during read operations.

A write driver 218 in the preamplifier 206 generates and drives a bipolar programmable write current through the write head 208 based upon the write data 216. A pattern dependent write controller 230 in the preamplifier 206 receives the pattern dependent write signal 228 and programs or controls the write driver 218 at each transition of the write data 216 according to the magnet lengths indicated by the pattern dependent write signal 228. The pattern dependent write controller 230 latches or samples the value of the pattern dependent write signal 228 based on a sampling clock in the pattern dependent write controller 230 using any suitable circuitry. In some embodiments, the pattern dependent write controller 230 includes a clock enable signal that is used to disable the sampling clock to preclude sampling of the pattern dependent write signal 228 at particular edges of the write data based on previous states or values of the pattern dependent write signal 228 in order to relax the timing of the pattern dependent write signal 228 and to relax the sampling timing in the pattern dependent write controller 330. The pattern dependent write controller 230 and write driver 218 can control any type of write current characteristic, such as, but not limited to, write current overshoot amplitude at transitions, with different overshoot amplitude levels selected based on magnet length. The pattern detector and pattern dependent write signal generator 220 in the write data circuit 202 and the pattern dependent write controller 230 in the preamplifier 206 are adapted to generate and interpret the pattern dependent write signal 222, 228 using the same encoding/decoding method and state mapping, for example using PAM-3 encoding of magnet lengths, with various magnet lengths mapped to particular states or amplitudes in the PAM-3 encoded pattern dependent write signals 222, 228. A variety of example encoding and mapping embodiments are disclosed herein. Based on the disclosure herein, one of ordinary skill in the art will recognize a variety of circuits and encodings/mappings that can be used to implement the pattern dependent write controller 230 in the preamplifier 206 in accordance with various embodiments of the present invention.

Figure 3:
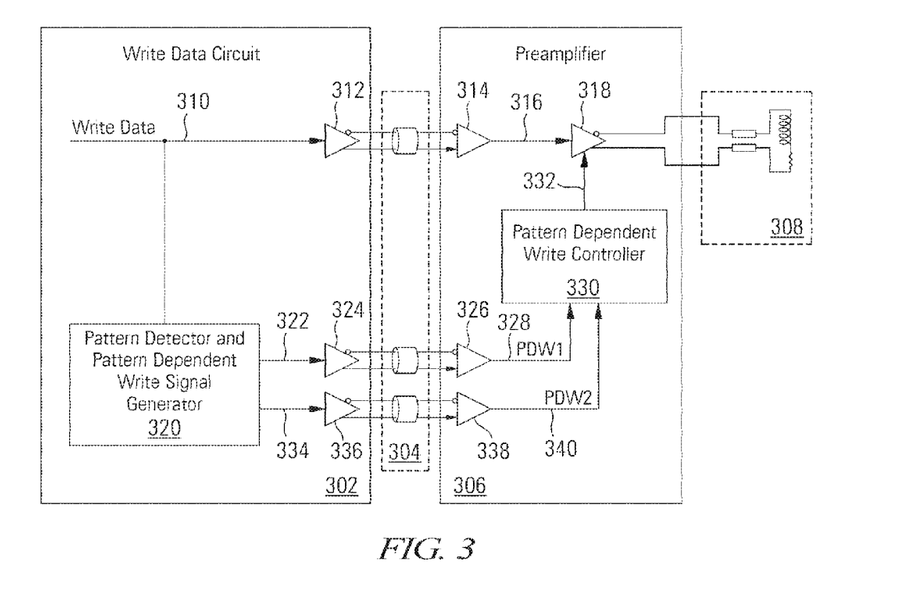
FIG. 3 depicts a write data circuit and preamplifier with dual ternary pattern dependent write signaling in accordance with some embodiments of the present invention.

Turning to FIG. 3, in some embodiments a write data circuit 302 and preamplifier 306 apply dual ternary pattern dependent write signaling. By generating two pattern dependent write signals 322, 334 to represent the magnet lengths in the write data 310, different mappings and relaxed timing requirements can be used. The write data circuit 302 processes the write data 310 for storage, for example by serializing the data, applying pre-compensation, or in any other desired manner. The write data circuit 302 includes a pattern detector and pattern dependent write signal generator 320 which identifies magnet lengths in the write data 310 and generates two (or more) pattern dependent write signals 322, 334 identifying the magnet lengths. In some embodiments, the pattern dependent write signals 322, 334 identify the length of future magnets to allow time for processing in the preamplifier 306. The pattern detector and pattern dependent write signal generator 320 can use any suitable circuit for identifying magnet lengths, such as, but not limited to, chains of flip flops with logic gates combining the outputs of the flip flops, state machines, etc. In some embodiments, the pattern dependent write signals 322, 334 are ternary or other multi-level signals, and the pattern detector and pattern dependent write signal generator 320 can use any suitable circuit for generating the signals 322, 334 identifying magnet lengths in the write data 310. Based on the disclosure herein, one of ordinary skill in the art will recognize a variety of circuits and techniques that can be used to detect magnet lengths in the write data 310 and to generate the ternary signals to identify the magnet lengths in accordance with various embodiments of the present invention.

In some embodiments, the write data 310 and pattern dependent write signals 322, 334 are transmitted as differential signals over a flexible circuit 304 for noise immunity. Differential transmitters 312, 324, 336 are thus included in the write data circuit 302. Differential receivers 314, 326, 338 are included in the preamplifier 306 in these embodiments, yielding write data 316 and pattern dependent write signals 328, 340 in the preamplifier 306. The preamplifier 306 is operable to process the write data 316 for recording on a magnetic storage medium using a write head 308 during write operations, as well as to amplify analog readback signals from the write head 308 during read operations.

A write driver 318 in the preamplifier 306 generates and drives a bipolar programmable write current through the write head 308 based upon the write data 316. A pattern dependent write controller 330 in the preamplifier 306 receives the pattern dependent write signals 328, 340 and programs or controls the write driver 318 at each transition of the write data 316 according to the magnet lengths indicated by the pattern dependent write signals 328, 340. The pattern dependent write controller 330 and write driver 318 can control any type of write current characteristic, such as, but not limited to, write current overshoot amplitude at transitions, with different overshoot amplitude levels selected based on magnet length. The pattern detector and pattern dependent write signal generator 320 in the write data circuit 302 and the pattern dependent write controller 330 in the preamplifier 306 are adapted to generate and interpret the pattern dependent write signals 322, 334, 328, 340 using the same encoding/decoding method and state mapping, for example using PAM-3 encoding of magnet lengths, with various magnet lengths mapped to particular states or amplitudes in the PAM-3 encoded pattern dependent write signals 322, 334, 328, 340. A variety of example encoding and mapping embodiments are disclosed herein. Based on the disclosure herein, one of ordinary skill in the art will recognize a variety of circuits and encodings/mappings that can be used to implement the pattern dependent write controller 330 in the preamplifier 306 in accordance with various embodiments of the present invention.

A number of different mappings between states of the pattern dependent write signal(s) and magnet lengths are disclosed herein in accordance with some embodiments of the present invention. However, the magnetic recording system with relaxed timing and/or advanced magnet length signaling disclosed herein is not limited to any particular number of pattern dependent write signal(s) or mappings to magnet lengths. Table 1 below visually represents the magnet lengths preceding and following a transition in the write data that can be represented by a variety of pattern dependent write signaling schemes.

TABLE 1

Write Current Characteristic Table Size
Comparison For Various Signaling Types

| Following Magnet Length | Preceding Magnet Length | | | | | | | | |
|---|---|---|---|---|---|---|---|---|---|
| | 1 | 2 | 3 | 4 | 5 | 6 | 7 | 8 | 9 |
| 1 | A | A | B | C | D | E | E | E | E |
| 2 | A | A | B | C | D | E | E | E | E |
| 3 | B | B | B | C | D | E | E | E | E |
| 4 | C | C | C | C | D | E | E | E | E |
| 5 | D | D | D | D | D | E | E | E | E |
| 6 | E | E | E | E | E | E | E | E | E |
| 7 | E | E | E | E | E | E | E | E | E |
| 8 | E | E | E | E | E | E | E | E | E |
| 9 | E | E | E | E | E | E | E | E | E |

A—Single non-return to zero (NRZ), single PAM-3 Relaxed (2T)
B—Single PAM-3, Double PAM-3 Relaxed (3T)
C—Double NRZ
D—Double PAM-3 Relaxed (2T)
E—Double PAM-3

Denoted by the letter A in Table 1, a single PAM-3 ternary pattern dependent write signal with relaxed 2 T timing as disclosed herein can communicate preceding and following magnet lengths of 1 T and 2 T from the write data circuit to the preamplifier, as well as a single non-return to zero (NRZ) pattern dependent write signal, although the timing margin for the single PAM-3 signal with relaxed 2 T timing is at least twice as good as for the NRZ signal. Denoted by the letter B in Table 1, a single PAM-3 pattern dependent write signal or a double PAM-3 pattern dependent write signal (two ternary signals in parallel) with relaxed 3 T timing can communicate preceding and following magnet lengths of 1 T, 2 T, and 3 T or longer. Thus, signaling schemes denoted as B in Table 1 provide more write current characteristic options than signaling schemes denoted as A in Table 1. Different write current characteristics can be selected in the preamplifier for a write data transition in B schemes based on whether there are 1 T, 2 T, or 3 T+ magnets preceding and following the transition, providing 9 different write current characteristic options if desired, whereas in A schemes different write current characteristics can be selected based on whether there are 1 T or 2 T+ magnets preceding and following the transition, providing 4 different write current characteristic options if desired.

Denoted by the letter C in Table 1, a double NRZ pattern dependent write signal can communicate preceding and following magnet lengths of 1 T, 2 T, 3 T and 4 T+. Denoted by the letter D in Table 1, a double PAM-3 pattern dependent write signal with relaxed 2 T timing can communicate preceding and following magnet lengths of 1 T, 2 T, 3 T, 4 T and 5 T+. Denoted by the letter E in Table 1, a double PAM-3 pattern dependent write signal can communicate preceding and following magnet lengths of 1 T, 2 T, 3 T, 4 T, 5 T and 6 T+. This pattern can be continued with additional pattern dependent write signaling schemes with additional numbers of pattern dependent write signals using various mappings that relax timing constraints to different degrees. Based on the disclosure herein, one of ordinary skill in the art will recognize a variety of pattern dependent write signaling schemes and mappings that can be used in accordance with various embodiments of the present invention.

Figure 4:
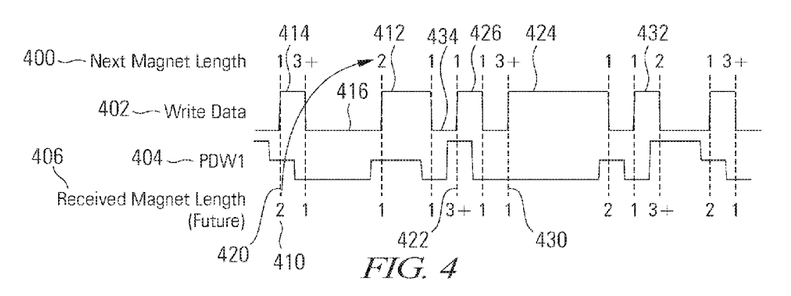
FIG. 4 depicts a timing diagram for magnet length signaling between a write data circuit and preamplifier for an example write data stream using a single three-level pulse-amplitude modulation (PAM-3) signal in accordance with some embodiments of the present invention.

Turning to FIG. 4, a timing diagram for magnet length signaling between a write data circuit and preamplifier for an example stream of write data 402 using a single three-level pulse-amplitude modulation (PAM-3) pattern dependent write (PDW) signal 404 is depicted in accordance with some embodiments of the present invention. Again, when generating a write current through a write head based on the write data 402, a current overshoot on the rising or falling edge or other variations to the write current can be made to cause the magnetic field of the write head to switch more rapidly. Such magnet length-dependent write current variations are generically referred to herein as boost, although the system is not limited to use with any particular type or number of pattern dependent write current characteristics.

The magnet immediately following each transition is referred to herein as the next magnet length 400. The example write data 402 sequence depicted in the timing diagram of FIG. 4 has a rising edge or rising transition with an immediately following magnet of length 1 T, then a falling edge with an immediately following magnet of length 3, a rising edge with an immediately following magnet of length 2, etc. Sampling points for the pattern dependent write signal 404 are marked by vertical dashed lines (e.g., 420), which in some embodiments are at transitions in write data 402.

Notably, in this embodiment, the pattern dependent write signal 404 signals the length of magnets in write data received by the preamplifier that are two magnets in advance of the write data 402. Thus, the first received magnet length 406 signaled by the pattern dependent write signal 404 is 2 T 410, representing the length of the magnet 412 following the first depicted magnet 414 of length 1 T and the second depicted magnet 416 of length 3 T. Thus when the pattern dependent write signal 404 is sampled at sampling point 420, it has an amplitude level of 0, mapped in this embodiment to a magnet length of 2 T, representing the length of the magnet 412 two magnets in the future. When the pattern dependent write signal 404 is sampled at sampling point 422, it has an amplitude level of 1, mapped in this embodiment to a magnet length of 3 T+, representing the length of the magnet 424 two magnets ahead of the magnet immediately following its current magnet 426. When the pattern dependent write signal 404 is sampled at sampling point 430, it has an amplitude level of −1, mapped in this embodiment to a magnet length of 1 T, representing the length of the magnet 424 two magnets ahead of the magnet immediately following its current magnet 424.

The pattern dependent write signal 404 of FIG. 4 has normal or narrow timing. The timing requirements for sampling the pattern dependent write signal 404 in the preamplifier in the embodiment of FIG. 4 are not relaxed, meaning that with a write data 402 signal with bit periods and possible transitions at every 1 T interval, the pattern dependent write signal 404 can also change state at 1 T intervals requiring that it be sampled at 1 T intervals. Some other embodiments have relaxed timing, meaning that although the write data 402 signal still has bit periods and possible transitions at every 1 T interval, states of the pattern dependent write signal(s) are is mapped to magnet lengths in such a way that the pattern dependent write signal(s) change states at less frequent intervals such as, but not limited to, 2 T or 3 T, so that it can be sampled in the preamplifier at larger intervals.

Although the embodiment of FIG. 4 has a pattern dependent write signal 404 with narrow timing, by signaling magnet lengths two magnets in advance one magnet length of additional time is provided for processing in the preamplifier, and when a transition arrives the preamplifier is aware based on the pattern dependent write signal 404 at least the length of the magnets immediately preceding and following the transition. The write current boost can then be selected and applied to the write current to the write head as a function of the magnet lengths communicated from the write data circuit to the preamplifier by the pattern dependent write signal 404. Although various example embodiments disclosed herein communicate magnets lengths two magnets in the future, the pattern dependent write signaling is not limited to any particular number of magnets advance or to any particular measure of advance communication.

The example mapping between states in the pattern dependent write signal 404 of FIG. 4 and write data magnet lengths is summarized in Table 2 below.

TABLE 2

PAM-3 Single Signaling

| Signal | Magnet Length | $2^{nd}$ Magnet Length | Disable Clocks |
|---|---|---|---|
| A | 1 | ? | 0 |
| B | 2 | ? | 0 |
| C | 3+ | ? | 0 |

As shown in Table 2, the pattern dependent write signal 404 has three states A, B and C which can be assigned to any of the three amplitude levels in the ternary pattern dependent write signal 404, such as, but not limited to, level −1, level 0 and level 1, respectively as shown in FIG. 4. The term "magnet length" refers to the length of the first magnet being communicated by the state of the PAM-3 signal, which in some embodiments refers to a magnet that is two magnets in advance of a current magnet when the PAM-3 pattern dependent write signal 404 is sampled at the edge of the write data. The term "$2^{nd}$ magnet length" refers to the magnet immediately following the first magnet length signaled by the sampled PAM-3 pattern dependent write signal 404, which in those embodiments refers to a magnet that is three magnets in advance of the current magnet that begins at the edge of the write data. The question marks in all three states of the PAM-3 signal for the $2^{nd}$ magnet length indicate that the single PAM-3 pattern dependent write signal 404 does not communicate information about the $2^{nd}$ magnet length, unlike some other embodiments disclosed herein. For example, at sampling point 410, the magnet length communicated by pattern dependent write signal 404 is the length of magnet 412, and the $2^{nd}$ magnet length would be the length of magnet 434, although in this case the single PAM-3 pattern dependent write signal 404 with normal timing does not communicate information about $2^{nd}$ magnet lengths.

Figure 5:
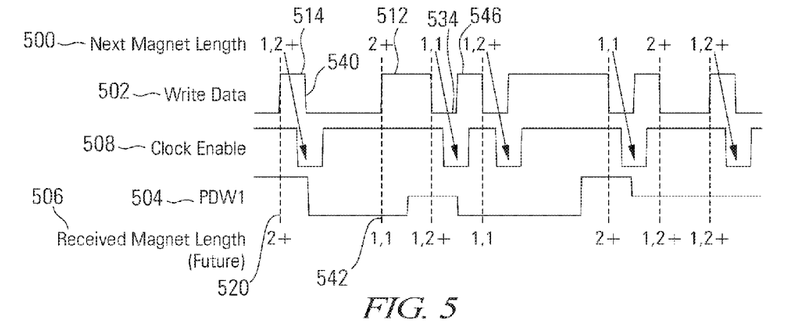
FIG. 5 depicts a timing diagram for magnet length signaling between a write data circuit and preamplifier for an example write data stream using a single three-level pulse-amplitude modulation (PAM-3) signal with relaxed 2 T timing in accordance with some embodiments of the present invention.

Turning to FIG. 5, a timing diagram for magnet length signaling between a write data circuit and preamplifier for an example stream of write data 502 using a single PAM-3 pattern dependent write signal 504 with relaxed 2 T timing is depicted in accordance with some embodiments of the present invention. By relaxing the timing of the pattern dependent write signal 504, the preamplifier only has to sample the pattern dependent write signal 504 at every other edge of the write data 502 in the worst case. This gives at least twice the time between one sample and the next, greatly increasing the timing margin, although the improvement in timing margin can be even greater when considering pre-compensation applied to the write data 502.

With a single PAM-3 pattern dependent write signal 504 with relaxed 2 T timing, a single pattern dependent write signal 504 is still transmitted from the write data circuit to the preamplifier, however, the state of each sample of the pattern dependent write signal 504 can communicate information about the length of two successive magnet lengths. Because of this, the pattern dependent write signal 504 need not be sampled at every edge of the write data 502, which can transition at 1 T intervals. Rather, the pattern dependent write signal 504 can be sampled at 2 T intervals at every other edge of the write data 502.

The sampling of the pattern dependent write signal 504 is controlled by a clock signal that sets the sampling points (e.g., 520). A clock enable signal 508, when asserted, enables the sampling clock signal causing the pattern dependent write signal 504 to be sampled at appropriate edges of the write data 502. When the clock enable signal 508 is deasserted, it disables the sampling clock signal which prevents the pattern dependent write signal 504 from being sampled at edges at which it would otherwise have been sampled. The clock enable signal 508 is deasserted at second successive 1 T transitions of the write data 502, causing the sampling period of the pattern dependent write signal 504 to be at least 2 T. In other words, when the write data 502 transitions 1 T after an earlier transition, the clock enable signal 508 is deasserted during the second transition at the end of a 1 T magnet. For example, the pattern dependent write signal 504 is sampled at sampling point 520 on the rising edge of the write data 502. Because the write data 502 then has a falling edge 540 after 1 T magnet 514, which would otherwise cause the pattern dependent write signal 504 to be sampled at the 1 T interval, the clock enable signal 508 is deasserted during the second edge 540 of the write data 502. As shown in FIG. 5, the pattern dependent write signal 504 is adapted in some embodiments to have transitions at intervals at least 2 T apart, which reduces the frequency of the pattern dependent write signal 504, simplifying the hardware requirements for the signal.

Some states of the pattern dependent write signal 504 communicate the magnet lengths of a single magnet in this embodiment, while other states communicate the magnet lengths of two successive magnets. The received magnet length 506 represented by the state of the pattern dependent write signal 504 captured at sampling point 520 represents the length of magnet 512, which is 2 T or longer. The state of the pattern dependent write signal 504 captured at sampling point 542 represents the lengths of magnets 544 and 546, which are each 1 T in length.

Some states of the pattern dependent write signal 504 communicate magnet lengths two magnets in advance. For example, the state of the pattern dependent write signal 504 captured at sampling point 520 represents the length of magnet 512, which is two magnets in the future from magnet 514, the magnet immediately following the write data edge at sampling point 520. However, the state of the pattern dependent write signal 504 captured at sampling point 542 represents the lengths of magnets 544, 546, which are one and two magnets in the future from magnet 512, the magnet immediately following the write data edge at sampling point 542.

The example mapping between states in the pattern dependent write signal 504 of FIG. 5 and write data magnet lengths is summarized in Table 3 below.

TABLE 3

PAM-3 Single Signaling with Relaxed Timing (2T)

| Signal | Magnet Length | $2^{nd}$ Magnet Length | Disable Clocks |
|---|---|---|---|
| A | 1 | 1 | 1 |
| B | 1 | 2+ | 1 |
| C | 2+ | ? | 0 |

As shown in Table 3, the pattern dependent write signal 504 has three states A, B and C which can be assigned to any of the three amplitude levels in the ternary pattern dependent write signal 404, such as, but not limited to, level −1, level 0 and level 1, respectively as shown in FIG. 5. State A indicates that two successive magnets both of length 1 T will be received, disabling the clock at the next transition of the write data. State B indicates that two successive magnets will be received, the first of length 1 T and the second of length 2 T or more, disabling the clock at the next transition of the write data. State C indicates that a magnet of length 2 T or more will be received, and does not communicate information about the following magnet. The write data transitions to be used sampling points for the pattern dependent write signal 504 are determined based on the states of the received pattern dependent write signal 504. As shown in FIG. 5, after there is a 2 T+ length magnet in write data 502 communicated earlier by state C of the pattern dependent write signal 504, the pattern dependent write signal 504 will be sampled again at the next transition of the write data 502. In all other cases the pattern dependent write signal 504 is sampled after two transitions of the write data 502. The sampling points for the pattern dependent write signal 504 are set in this manner using the clock enable signal 508, such that the pattern dependent write signal 504 is sampled at each transition of the write data 502 except when the clock enable signal 508 has disabled the sampling clock.

In another embodiment, two pattern dependent write signals are used to communicate magnet lengths in a double PAM-3 system with normal timing, with states as shown in Table 4 below.

TABLE 4

PAM-3 Double Signaling

| Signal | Magnet Length | $2^{nd}$ Magnet Length | $3^{rd}$ Magnet Length | Disable Clocks |
|---|---|---|---|---|
| AA | 1 | ? | ? | 0 |
| AB | 2 | ? | ? | 0 |
| AC | 3 | ? | ? | 0 |
| BA | 4 | ? | ? | 0 |
| BB | 5 | ? | ? | 0 |
| BC | 6 | ? | ? | 0 |
| CA | 7 | ? | ? | 0 |
| CB | 8 | ? | ? | 0 |
| CC | 9+ | ? | ? | 0 |

As shown in Table 4, the two PAM-3 pattern dependent write signals each have three states A, B and C which can be assigned to any of the three amplitude levels in the ternary pattern dependent write signals. The two PAM-3 pattern dependent write signals, considered together, have nine possible states, AA, AB, AC, BA etc., to CC as shown in the first column of Table 4. In this embodiment, each of the first eight states communicate magnet lengths of 1 T to 8 T, respectively, with the ninth state representing a magnet length of 9 T or more. None of the states communicate information about $2^{nd}$ or $3^{rd}$ magnets, and none of the states disable the sampling clock.

In another embodiment, two pattern dependent write signals are used to communicate magnet lengths in a double PAM-3 system with relaxed timing (2 T), with states as shown in Table 5 below.

TABLE 5

PAM-3 Double Signaling with Relaxed Timing (2T)

| Signal | Magnet Length | $2^{nd}$ Magnet Length | $3^{rd}$ Magnet Length | Disable Clocks |
|---|---|---|---|---|
| AA | 1 | 1 | ? | 1 |
| AB | 1 | 2 | ? | 1 |
| AC | 1 | 3 | ? | 1 |
| BA | 1 | 4 | ? | 1 |
| BB | 1 | 5+ | ? | 1 |
| BC | 2 | ? | ? | 0 |
| CA | 3 | ? | ? | 0 |
| CB | 4 | ? | ? | 0 |
| CC | 5+ | ? | ? | 0 |

As shown in Table 5, the two PAM-3 pattern dependent write signals each have three states A, B and C, combining in nine possible states, some of which are mapped to communicate the lengths of multiple successive magnets in such a manner that the pattern dependent write signals require sampling no more frequently than at 2 T intervals. The term "magnet length" refers to the length of the first magnet being communicated by the state of the PAM-3 signals, the term "$2^{nd}$ magnet length" refers to the length of the magnet immediately following the first magnet, and the term "$3^{rd}$ magnet length" refers to the length of the magnet immediately following the second magnet.

State AA communicates the length of two successive magnets to be received, each of length 1 T, disabling the clock at the next transition of the write data. State AB communicates the length of two successive magnets to be received, the first of length 1 T and the second of length 2 T, disabling the clock at the next transition of the write data. State AC communicates the length of two successive magnets to be received, the first of length 1 T and the second of length 3 T, disabling the clock at the next transition of the write data. State BA communicates the length of two successive magnets to be received, the first of length 1 T and the second of length 4 T, disabling the clock at the next transition of the write data. State BB communicates the length of two successive magnets to be received, the first of length 1 T and the second of length 5 T or more, disabling the clock at the next transition of the write data. State BC communicates the length of one magnet to be received, with length 2 T. State CA communicates the length of one magnet to be received, with length 3 T. State CB communicates the length of one magnet to be received, with length 4 T. State CC communicates the length of one magnet to be received, with length 5 T or more. None of the states communicate information about a third successive magnet length.

Figure 6:
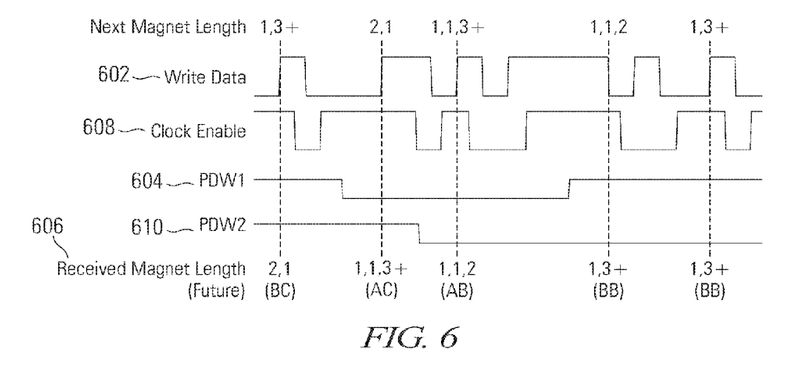
FIG. 6 depicts a timing diagram for magnet length signaling between a write data circuit and preamplifier for an example write data stream using dual three-level pulse-amplitude modulation (PAM-3) signals with relaxed 3 T timing in accordance with some embodiments of the present invention.

Turning to FIG. 6, a timing diagram for magnet length signaling between a write data circuit and preamplifier for an example stream of write data 602 using dual PAM-3 pattern dependent write signals 604, 610 with relaxed 3 T timing is depicted in accordance with some embodiments of the present invention. In this embodiment, the sampling timing for the pattern dependent write signals 604, 610 is relaxed to require sampling no more frequently than every 3 T.

Some states of the pattern dependent write signals 604, 610 communicate the magnet lengths of two successive magnets in this embodiment, while other states communicate the magnet lengths of three successive magnets. The received magnet length 606 is represented by the state of the pattern dependent write signals 604, 610, captured at sampling points that are controlled using a clock enable signal 608.

Although based on the example stream of write data 602 shown in FIG. 6, the pattern dependent write signals 604, 610 are shown with only two amplitude levels or states each, these are PAM-3 signals that have three possible amplitude levels or states each.

The example mapping between states of the pattern dependent write signals 604, 610 using double PAM-3 with relaxed timing (3 T) of FIG. 6 and write data magnet lengths is summarized in Table 6 below.

TABLE 6

PAM-3 Double Signaling with Relaxed Timing (3T)

| Signal | Magnet Length | 2$^{nd}$ Magnet Length | 3$^{rd}$ Magnet Length | Disable Clocks |
|---|---|---|---|---|
| AA | 1 | 1 | 1 | 2 |
| AB | 1 | 1 | 2 | 2 |
| AC | 1 | 1 | 3+ | 2 |
| BA | 1 | 2 | ? | 1 |
| BB | 1 | 3+ | ? | 1 |
| BC | 2 | 1 | ? | 1 |
| CA | 2 | 2 | ? | 1 |
| CB | 2 | 3+ | ? | 1 |
| CC | 3+ | ? | ? | 0 |

As shown in Table 6, the two PAM-3 pattern dependent write signals each have three states A, B and C, combining in nine possible states, some of which are mapped to communicate the lengths of two successive magnets and some of which are mapped to communicate the lengths of three successive magnets in such a manner that the pattern dependent write signals require sampling no more frequently than at 3 T intervals.

State AA communicates the length of three successive magnets to be received, each of length 1 T, disabling the clock for the next two transitions of the write data. State AB communicates the length of three successive magnets to be received, the first two of length 1 T and the third of length 2 T, disabling the clock for the next two transitions of the write data. State AC communicates the length of three successive magnets to be received, the first two of length 1 T and the third of length 3 T or more, disabling the clock for the next two transitions of the write data. State BA communicates the length of two successive magnets to be received, the first of length 1 T and the second of length 2 T, disabling the clock at the next transition of the write data. State BB communicates the length of two successive magnets to be received, the first of length 1 T and the second of length 3 T or more, disabling the clock at the next transition of the write data. State BC communicates the length of two successive magnets to be received, the first of length 2 T and the second of length 1 T, disabling the clock at the next transition of the write data. State CA communicates the length of two successive magnets to be received, each of length 2 T, disabling the clock at the next transition of the write data. State CB communicates the length of two successive magnets to be received, the first of length 2 T and the second of length 3 T or more, disabling the clock at the next transition of the write data. State CC communicates the length of one magnet to be received, with length 3 T or more, without disabling the pattern dependent write sampling clock.

Pattern dependent write signals can use other signaling schemes, including using more amplitude levels, as well as NRZ signals using the mappings shown in Tables 7-9, although the use of PAM-3 signals to relax sampling timing provides additional benefits.

TABLE 7

NRZ Single Signaling

| Signal | Magnet Length | 2$^{nd}$ Magnet Length | Disable Clocks |
|---|---|---|---|
| A | 1 | ? | 0 |
| B | 2+ | ? | 0 |

TABLE 8

NRZ Double Signaling

| Signal | Magnet Length | 2$^{nd}$ Magnet Length | Disable Clocks |
|---|---|---|---|
| AA | 1 | ? | 0 |
| AB | 2 | ? | 0 |
| BA | 3 | ? | 0 |
| BB | 4+ | ? | 0 |

TABLE 9

NRZ Double Signaling with Relaxed Timing (2T)

| Signal | Magnet Length | 2$^{nd}$ Magnet Length | Disable Clocks |
|---|---|---|---|
| AA | 1 | 1 | 1 |
| AB | 1 | 2+ | 1 |
| BA | 2+ | ? | 0 |

Again, the pattern dependent write signaling disclosed herein communicates magnet lengths from the write data circuit to the preamplifier in a magnetic storage system, rather than directly communicating boost values. The preamplifier is operable to select boost values for each write data transition based on preceding and following magnet lengths as communicated by the pattern dependent write signal(s). In some embodiments, the pattern dependent write signal states are mapped to magnet lengths in a manner that relaxes the timing requirements in the preamplifier for sampling the pattern dependent write signal(s). In these embodiments, where there are length 1 T magnets, the preamplifier is not required to sample the pattern dependent write signal(s) at 1 T intervals.

Figure 7:
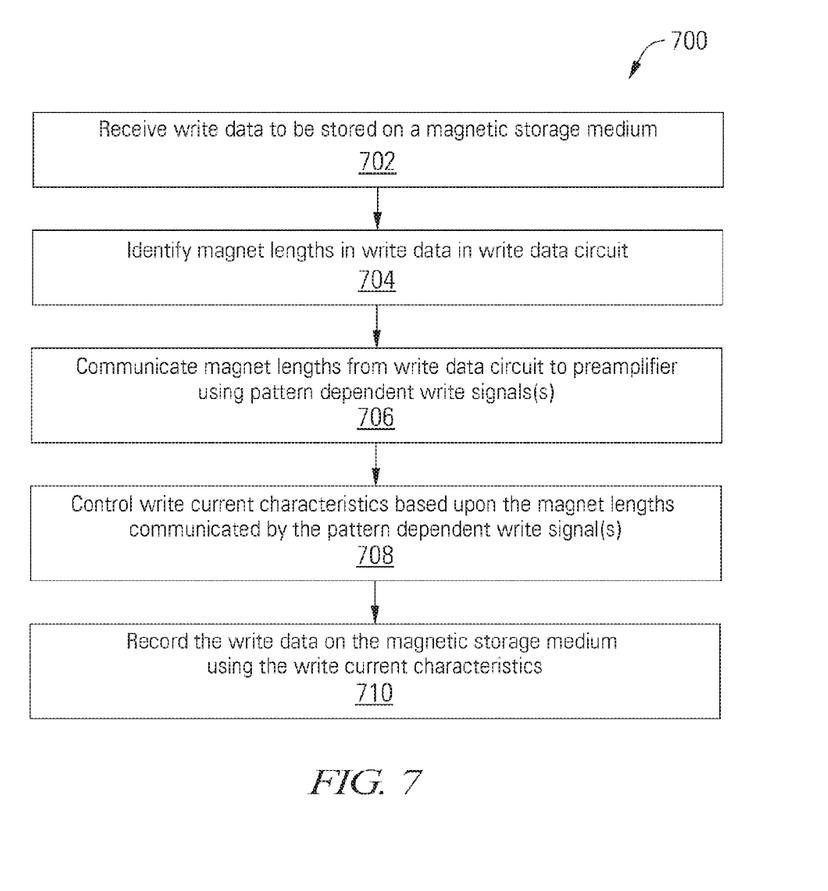
FIG. 7 depicts an operation for writing data in a magnetic recording system including ternary magnet length signaling between a write data circuit and preamplifier in accordance with some embodiments of the invention.

Turning to FIG. 7, an operation for writing data in a magnetic recording system including ternary magnet length signaling between a write data circuit and preamplifier is depicted in flow diagram 700 in accordance with some embodiments of the invention. Following flow diagram 700, write data is received to be stored on a magnetic storage medium. (Block 702) Magnet lengths in the write data are determined in a write data circuit. (Block 704) The magnet lengths are communicated from the write data circuit to a preamplifier using pattern dependent write signals(s). (Block 706) In some embodiments, the pattern dependent write signal(s) comprise one or more PAM-3 signals. In some embodiments, timing requirements are relaxed for sampling the pattern dependent write signals(s) in the preamplifier so that the pattern dependent write signals(s) need not be sampled in the preamplifier at intervals less than twice that of the write data transmitted from the write data circuit to the preamplifier. In some cases, the timing requirements are relaxed by representing the length of multiple successive magnets using the state of the pattern dependent write signals(s) at a single point in time. In some cases, sampling of the pattern dependent write signals(s) in the preamplifier is precluded at some transitions of the write data signal by disabling a pattern dependent write sampling clock enable signal. Write current characteristics are controlled in the preamplifier based upon the magnet lengths communicated by the pattern dependent write signal(s). (Block 708) The write data is recorded on the magnetic storage medium using the write current characteristics. (Block 710)

It should be noted that storage system 100 may be integrated into a larger storage system such as, for example, a RAID (redundant array of inexpensive disks or redundant array of independent disks) based storage system. It should also be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that some functions of the blocks, systems or circuits discussed herein may be implemented in either software or firmware. In some such cases, a part of a given system, block or circuit may be implemented in software or firmware, while other parts are implemented in hardware.

In conclusion, embodiments of the present invention provide novel systems, devices, methods and arrangements for communicating magnet lengths between a write data circuit and a preamplifier in a magnetic recording system, and for controlling write current characteristics in the preamplifier based on the magnet lengths. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. A storage system, comprising:
 a magnetic write head;
 a magnetic storage medium;
 a write data circuit comprising a write data output to output write data and a magnet length signal output to output a magnet length signal that communicates magnet lengths in the write data, wherein the write data circuit is operable to process the write data to be recorded on the magnetic storage medium by the magnetic write head, and wherein at least some states of the magnet length signal are mapped to the magnet lengths to communicate the magnet lengths; and
 a preamplifier operable to receive the write data and the magnet length signal from the write data circuit, and to set at least one write current characteristic through the magnetic write head based at least in part on the magnet length signal.

2. The storage system of claim 1, wherein the write data circuit comprises a pattern detector operable to detect the magnet lengths in the write data.

3. The storage system of claim 1, wherein the preamplifier comprises a pattern dependent write controller operable to sample the magnet length signal to retrieve the magnet lengths.

4. The storage system of claim 3, wherein the pattern dependent write controller comprises a sampling clock enable signal operable to preclude the pattern dependent write controller from sampling the magnet length signal at transitions of the write data identified by previous values of the magnet length signal.

5. The storage system of claim 4, wherein the at least some states of the magnet length signal are mapped to communicate multiple successive magnet lengths in the write data.

6. The storage system of claim 1, wherein each magnet length is measured in multiples of bit periods used to record each bit in the write data output to the magnetic storage medium.

7. The storage system of claim 1, wherein the magnet length signal is a pulse-amplitude modulated signal.

8. The storage system of claim 7, wherein the pulse-amplitude modulated signal comprises a three level pulse-amplitude modulated signal.

9. The storage system of claim 1, wherein the magnet length signal comprises a pattern dependent write signal that identifies a length of a future magnet.

10. The storage system of claim 1, wherein the at least some states of the magnet length signal are operable to communicate a length of a future magnet advanced by at least two magnets with respect to the write data.

11. The storage system of claim 1, wherein the magnet length signal is sampled by the preamplifier on edges of the write data.

12. The storage system of claim 1, wherein the preamplifier is operable to select the at least one write current characteristic based on magnet lengths preceding and following each transition in the write data.

13. The storage system of claim 1, wherein the magnet length signal is a single signal.

14. The storage system of claim 1, wherein the magnet length signal is a plurality of signals.

15. A method of writing data to a magnetic storage device, the method comprising:
 receiving write data to be recorded on a magnetic storage device;
 identifying magnet lengths in the write data in a write data circuit;
 communicating the magnet lengths from the write data circuit to a preamplifier with a magnet length signal, wherein at least some states of the magnet length signal are mapped to the magnet lengths to communicate the magnet lengths;
 sampling the magnet length signal in the preamplifier to retrieve the magnet lengths;
 selecting at least one write current characteristic in the preamplifier based on the magnet lengths; and
 recording the write data on the magnetic storage device according to the at least one write current characteristic.

16. The method of claim 15, wherein the magnet length signal comprises at least one three level pulse-amplitude modulated signal.

17. The method of claim 15, further comprising disabling the sampling in the preamplifier for selected transitions of the write data based on previous values of the magnet lengths, whereby sampling timing of the magnet length signal is relaxed.

18. The method of claim 15, wherein at least one state of the magnet length signal communicates lengths of a plurality of successive magnets in the write data.

19. The method of claim 18, wherein the magnet length signal comprises a plurality of pulse-amplitude modulated signals each with at least three possible amplitudes.

20. A data processing system comprising:
   a write data circuit to:
      determine magnet lengths in write data to be stored on a magnetic storage device; and
      communicate the magnet lengths with a magnet length signal and at a frequency lower than that of the write data, wherein at least some states of the magnet length signal are mapped to the magnet lengths to communicate the magnet lengths; and
   a preamplifier to record the write data on the magnetic storage device based at least in part on the magnet lengths communicated from the write data circuit to the preamplifier by setting at least one write current characteristic based on the magnet lengths.

\* \* \* \* \*